（12）United States Patent
Wood-Gaines et al.

(10) Patent No.: US 7,577,955 B2
(45) Date of Patent: Aug. 18, 2009

(54) RENDERFARM MONITORING SYSTEM

(75) Inventors: Adam Wood-Gaines, Seattle, WA (US); Josh Grant, San Francisco, CA (US)

(73) Assignee: Pixar, Emeryville, CA (US)

( * ) Notice: Subject to any disclaimer, the term of this patent is extended or adjusted under 35 U.S.C. 154(b) by 694 days.

(21) Appl. No.: 11/072,836

(22) Filed: Mar. 3, 2005

(65) Prior Publication Data

US 2006/0095912 A1     May 4, 2006

Related U.S. Application Data

(60) Provisional application No. 60/625,307, filed on Nov. 4, 2004.

(51) Int. Cl.
*G06F 9/46*     (2006.01)

(52) U.S. Cl. .................. 718/101; 718/106; 718/107; 719/318

(58) Field of Classification Search ............... 709/200, 709/201, 219, 217, 246; 719/328, 330, 318; 718/100, 106, 107, 101
See application file for complete search history.

(56) References Cited

U.S. PATENT DOCUMENTS 7,082,604 B2 * 7/2006 Schneiderman ............. 718/100
7,092,983 B1 * 8/2006 Tyrrell, III ................... 709/201
7,177,917 B2 * 2/2007 Giotta ......................... 709/219
7,266,616 B1 * 9/2007 Munshi et al. ............... 709/246
2002/0144021 A1 * 10/2002 Pigos et al. .................. 709/330
2004/0172459 A1 * 9/2004 Schwalm et al. ............. 709/217
2004/0190042 A1 * 9/2004 Ferlitsch et al. ............. 358/1.15

OTHER PUBLICATIONS

International Search Report PCT/US05/17380.

* cited by examiner

*Primary Examiner*—Andy Ho
(74) *Attorney, Agent, or Firm*—Law Office of Jonathan Hollander PC

(57) ABSTRACT

A renderfarm monitoring system collects and aggregates comprehensive renderfarm information from a distributed scheduling system. Listener modules interface with dispatcher modules. The dispatcher modules queue jobs and tasks and request processing for those tasks in which the required input data is available. The listener modules receive streams of events from dispatcher modules indicating the status of all associated jobs and tasks. The listener modules also receive system status information from renderfarm and user computers. Renderfarm usage information, such as jobs, tasks, and system status, is aggregated by a database system. Client applications can access renderfarm usage information from the database system and use this information to monitor, analyze, visualize, and control renderfarm activities. Additionally, renderfarm usage information associated with tasks can be used to prioritize the jobs, improving overall renderfarm efficiency.

53 Claims, 8 Drawing Sheets

Sources

400

RENDERFARM MONITORING SYSTEM

CROSS-REFERENCE TO RELATED APPLICATIONS

This application claims priority to U.S. Provisional Application No. 60/625,307, entitled "RENDERFARM MONITORING SYSTEM" filed on Nov. 4, 2004, and incorporates by reference the disclosures of these applications herein for all purposes.

BACKGROUND OF THE INVENTION

The present invention relates to the field of computer graphics, and in particular to methods and apparatus for creating computer generated images and animations. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time.

A great deal of effort has been devoted to making realistic looking rendered images and animations. Rendering can include processing scenes with thousands of different objects, applying sophisticated lighting, shading, texturing, and animation algorithms; simulating physical phenomena; and performing intensive image processing calculations. Because of this, rendering realistic looking images typically is a computationally intensive task. Furthermore, as even one minute of animation typically requires thousands of rendered images, animators require large amounts of computing capacity to quickly and efficiently create animation.

A renderfarm is one solution for providing animators with large amounts of computing capacity. A renderfarm is a set of computers adapted to perform a large number of rendering or rendering-related tasks in parallel. In some implementations, a renderfarm is a cluster computing system comprising thousands or tens of thousands of server computers networked together. Each server computer can have its own memory and storage as well as access to shared memory and/or storage. Server computers can be general-purpose computers or computers including components specifically adapted to rendering and rendering-related tasks.

Many renderfarms use a distributed scheduling system, such as Pixar's Alfred, to manage the resources of the renderfarm. The distributed scheduling system typically uses a large number of independent dispatcher units to schedule user requests for renderfarm resources. The distributed scheduling system enables an animation studio with hundreds or thousands of animators to efficiently schedule a large number of complicated and often interdependent tasks to be processed by the renderfarm. Because of its distributed nature, the distributed scheduling system is highly scalable and robust.

Unfortunately, because the information on tasks is spread over numerous different dispatcher units, it is often difficult for system administrators to collect aggregate information on renderfarm usage. Furthermore, some renderfarm usage information, such as dependencies between different tasks, is unavailable to system administrators. The renderfarm usage information that is available to system administrators is often stored in log files and other data formats that make querying and analyzing renderfarm information difficult and time-consuming. As some renderfarm usage information is unavailable or difficult to obtain using a distributed scheduling system, some administrative tasks such as spotting and recovering from errors is time-consuming. Additionally, incomplete renderfarm usage information makes it difficult to prioritize tasks to maximize the efficiency of the renderfarm.

It is therefore desirable for a system and method to provide renderfarm users and administrators with more comprehensive renderfarm usage information. It is also desirable for the system and method to interface efficiently with the distributed scheduling system of a renderfarm and without risking disruptions to renderfarm activities. Furthermore, it is desirable for the system and method to enable quick and efficient querying and analysis of renderfarm information. It is also desirable for the system and method to help the distributed scheduling system to prioritize renderfarm tasks to maximize the efficiency of the renderfarm.

BRIEF SUMMERY OF THE INVENTION

An embodiment of the invention collects and aggregates comprehensive renderfarm information from a distributed scheduling system. Listener modules interface with dispatcher modules. The dispatcher modules queue jobs and tasks and request processing for those tasks in which the required input data is available. The listener modules receive streams of events from dispatcher modules indicating the status of all associated jobs and tasks. The listener modules also receive system status information from renderfarm and user computers. Renderfarm usage information, such as jobs, tasks, and system status, is aggregated by a database system. Client applications can access renderfarm usage information from the database system and use this information to monitor, analyze, visualize, and control renderfarm activities. Additionally, renderfarm usage information associated with tasks can be used to prioritize jobs, improving overall renderfarm efficiency.

In an embodiment, a system for monitoring a renderfarm, the system comprises a plurality of dispatcher modules and a plurality of listener modules. Each dispatcher module is adapted to receive a renderfarm job including at least one renderfarm task from an application. Each listener module is adapted to interface with and to receive renderfarm usage information from at least one of the plurality of dispatcher modules. A database system is adapted to aggregate renderfarm usage information from the plurality of listener modules.

Each of the plurality of listener modules is adapted to receive a stream of events from at least one of the plurality of dispatcher modules. The stream of events indicates renderfarm usage information. The renderfarm usage information may include a status of a renderfarm job. The renderfarm usage information may include a status of a renderfarm task. The status of the renderfarm task may indicate that the renderfarm task is being processed by the renderfarm, that the renderfarm task is waiting to be processed by the renderfarm, and/or that the renderfarm task requires the completion of a second renderfarm task included in the renderfarm job.

BRIEF DESCRIPTION OF THE DRAWINGS

The invention will be described with reference to the drawings, in which.

DETAILED DESCRIPTION OF THE INVENTION

Figure 1:
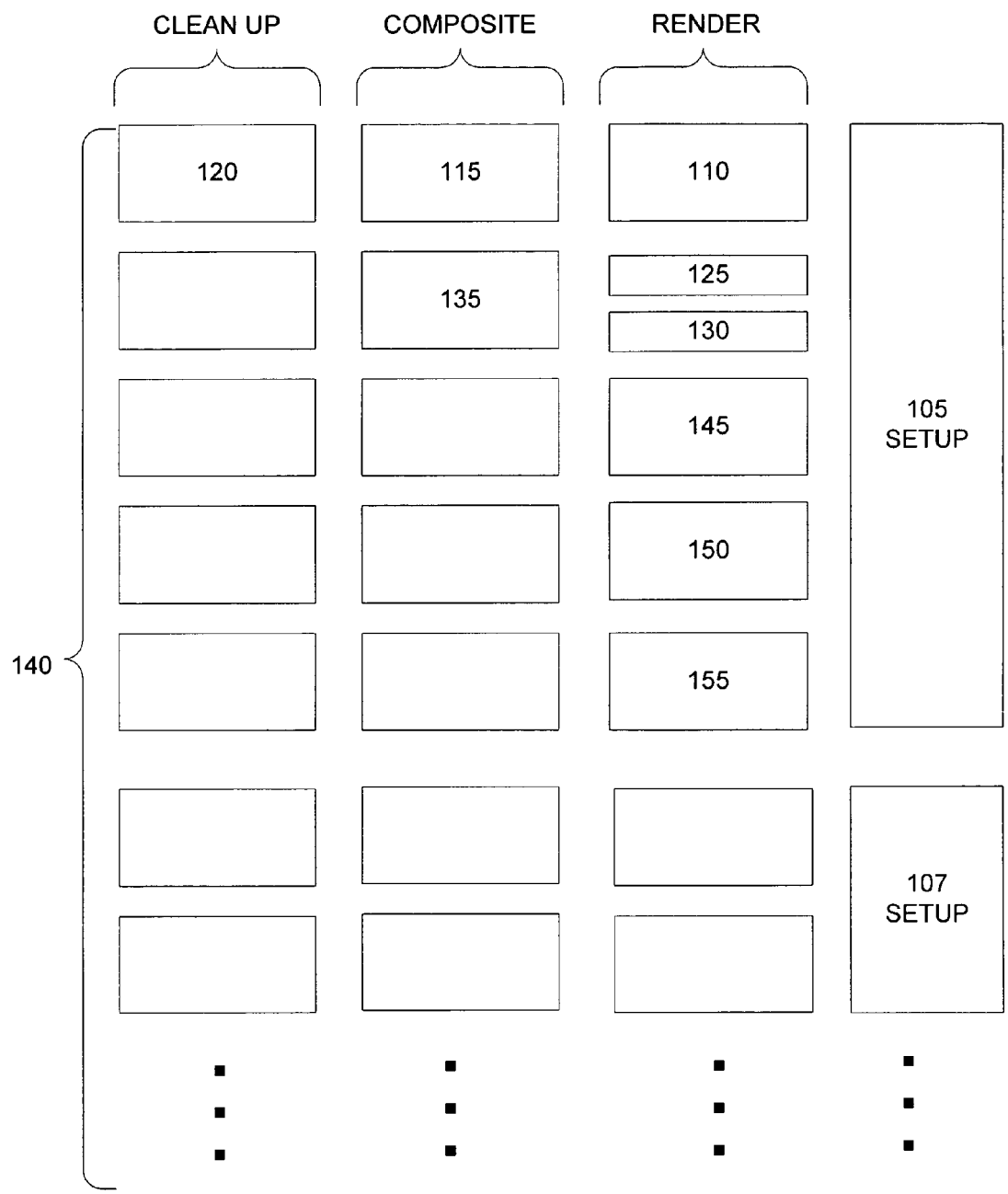
FIG. 1 is a block diagram illustrating a set of rendering tasks to be performed by a renderfarm and suitable for monitoring using a system according to an embodiment of the invention.

FIG. 1 is a block diagram 100 illustrating a set of rendering tasks to be performed by a renderfarm and suitable for monitoring using a system according to an embodiment of the invention. Block diagram 100 illustrates a renderfarm job 140. A renderfarm job 140 is a set of tasks to be performed by the renderfarm to produce a desired output. For example, job 140 may be an animated sequence to be rendered by the renderfarm. Job 140 includes numerous tasks. Each task represents a unit or bundle of work to be executed by the renderfarm. Each task has its own input data which is processed by the renderfarm to produce corresponding output data. The output data of a task can be used by other tasks as input data. Typically, each task can be independently executed, potentially in parallel with other tasks, provided its input data is available.

Block diagram 100 illustrates the interdependencies of the tasks of job 140. In block diagram 100, tasks in the same row are interdependent. In example job 140, each row represents the typical tasks used to produce a frame of animation. For example, the output of setup task 105 is used as input to rendering tasks 110, 125, 130, 145, 150, and 155. Each rendering tasks' output is used by a corresponding compositing step. For example, the output of rendering task 100 is input into compositing task 115. Similarly, the outputs of rendering tasks 125 and 130 are input into compositing task 135. Once a compositing task, such as task 115, is complete, a corresponding clean up task, such as task 120, is executed. The dependencies of tasks shown in FIG. 1 are for illustration and jobs can have tasks with arbitrary and often complex dependency relationships.

Although many tasks for a given frame are interdependent and must be executed sequentially, tasks from different frames can often be executed in parallel. For example, after setup task 105 is complete, any or all of the rendering tasks 110, 125, 130, 145, 150, and 155 can be executed in parallel. In block diagram 100, tasks in the same column can be executed in parallel, provided that each task's input data is available.

Figure 2:
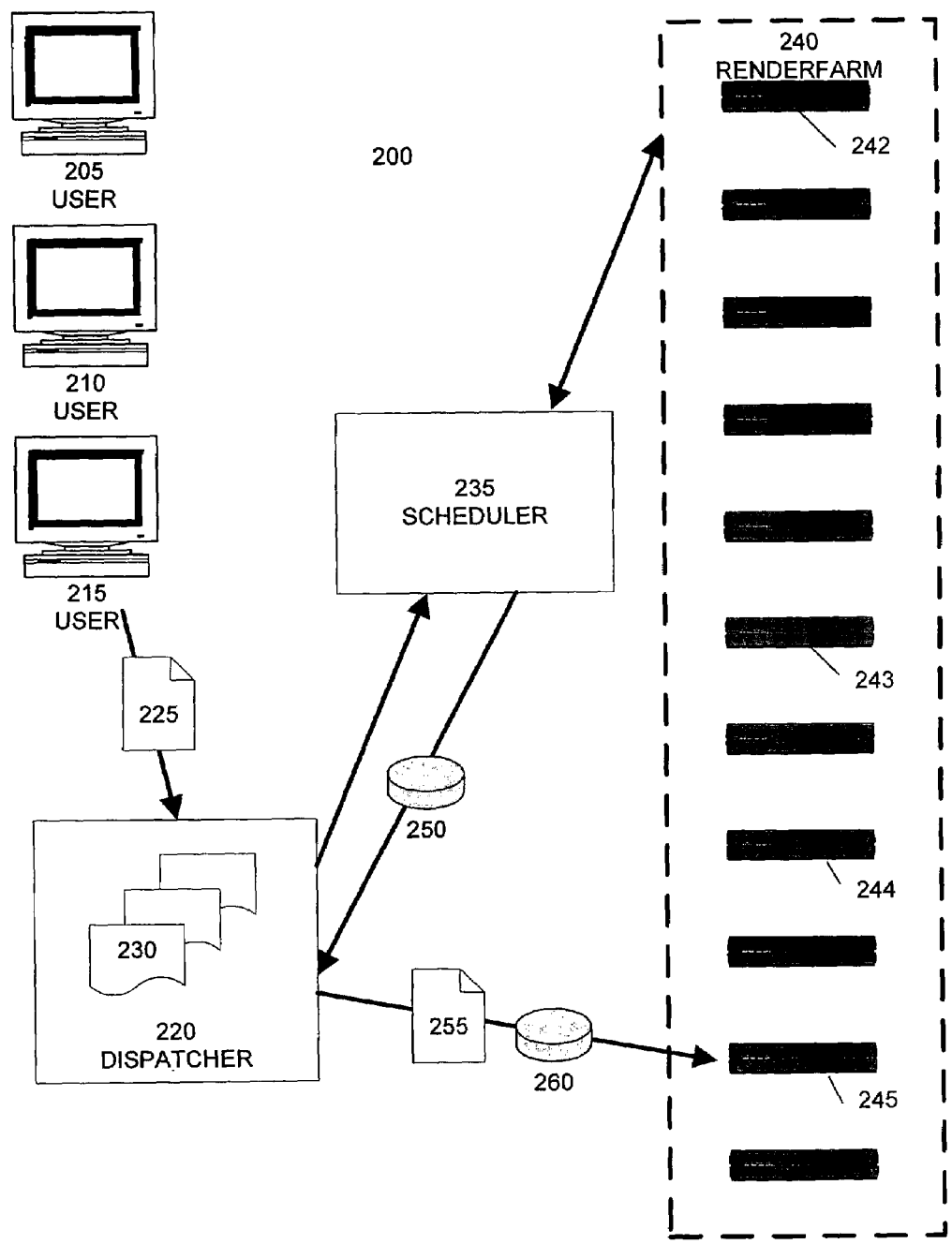
FIG. 2 illustrates an example distributed scheduling system of a renderfarm suitable for use with a system according to an embodiment of the invention.

A renderfarm for an animation studio typically handles thousands of jobs at a time, with each job having hundreds or thousands of tasks. A distributed scheduling system can be used to coordinate the processing of tasks by the renderfarm. FIG. 2 illustrates an example distributed scheduling system 200 of a renderfarm suitable for use with a system according to an embodiment of the invention. A set of users, including users 205, 210, and 215, are connected with a renderfarm 240. Renderfarm 240 typically includes a set of computers adapted to perform a large number of rendering or rendering related tasks in parallel. In some installations, a renderfarm is a cluster computing system comprising thousands or tens of thousands of server computers networked together. Each server computer can have its own memory and storage as well as access to shared memory and/or storage. Server computers can be general-purpose computers or be specifically adapted to rendering-related tasks.

In some implementations, each computer in renderfarm 240 provides one or more processing slots. A processing slot is a set of computing resources capable of processing a task. A processing slot may correspond with one or more processors distributed over one or more computers. In an embodiment, each slot is capable of processing any type of task. In an alternate embodiment, slots can have different capabilities, including: processing performance; memory and disk capacity; network bandwidth; and installed or licensed software applications; thus some slots may not satisfy the requirements of all types of tasks.

To process a job using the renderfarm, user 215 submits a job description 225 to a dispatcher module 220. In an embodiment, each user has a separate dispatcher module for coordinating his or her own jobs. In a further embodiment, each user's dispatcher module is operates on the user's computer. The job description 225 specifies one or more tasks and any associated data needed to create the desired output images or animation. The job description 225 can be generated manually by a user or automatically using computer graphics software, such as modeling or animation software.

Dispatcher 220 receives the job description 225 from the user 215. Dispatcher 220 parses the job description 225 and adds the tasks specified by the job description 225 to a list of tasks 230. The list of tasks 230 includes any outstanding tasks associated with one or more jobs requested by the user 215. The list of tasks 230 also stores dependencies between tasks, such as output data required from other tasks.

For each task on the list of tasks 230 that has its input data available, the dispatcher 220 requests an available processing slot in renderfarm 240 from scheduler module 235. Scheduler module 235 tracks the availability of processing slots in the renderfarm 240. In an embodiment, scheduler module 235 receives slot requests from multiple dispatchers. If necessary, scheduler module 235 determines which processing slots meet the requirements of the task associated with each processing slot request. If there are no available processing slots in the renderfarm, scheduler 235 queues pending processing slot requests.

Once a processing slot meeting the requirements of a processing slot request becomes available, such as processing slot 245, the scheduler module 235 returns slot assignment 250 to the requesting dispatcher module 220. The slot assignment specifies the processing slot to be used to process the task associated with the slot request. The dispatcher module then submits the appropriate task 255 to the assigned processing slot 245. In an embodiment, the dispatcher module 220 also submits a copy of the slot assignment 260 to the assigned processing slot 245 to verify that this task 255 is authorized to use the assigned slot 245.

The processing slot 245 processes the assigned task 255 and returns the resulting output data to the user 215 or to a shared data storage. The dispatcher module 220 is then notified that the task 255 is complete. Based upon this notification, the dispatcher module 220 evaluates the list of tasks 230 to determine if any additional tasks are dependent on the completed tasks. If the input data needed for any additional tasks is now available as a result of the completion of task 255, the dispatcher module 220 will request additional processing slots for these tasks. Once all of the tasks of job description 225 are complete, the dispatcher module 220 notifies the user 215.

In this example distributed scheduling system, information about pending jobs, queued or blocked tasks, and any dependencies are maintained by their associated dispatcher modules, rather than the scheduler module. As a result, renderfarm administrators must manually access and aggregate information from each dispatcher module to gain a comprehensive overview of the renderfarm usage.

To address this, an embodiment of a renderfarm monitoring system interfaces with the distributed scheduling system to collect and aggregate renderfarm usage information.

Figure 3:
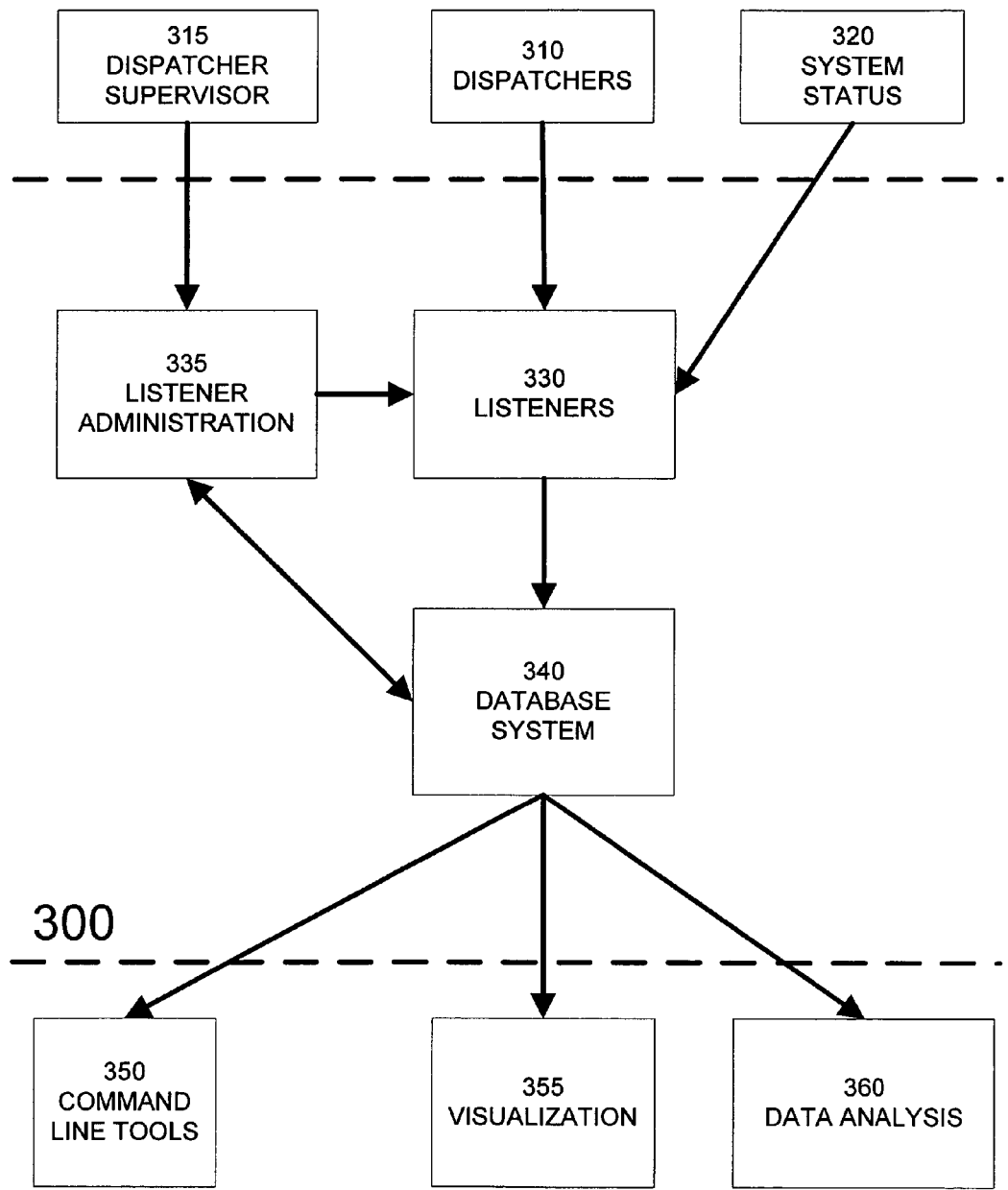
FIG. 3 illustrates a renderfarm monitoring system according to an embodiment of the invention.

FIG. 3 illustrates a renderfarm monitoring system 300 according to an embodiment of the invention. The renderfarm monitoring system collects renderfarm usage information from a set of sources 305. In an embodiment, the set of sources 305 include dispatcher modules 310, such as those discussed with reference to FIG. 2, a dispatcher supervisor 315, which is used by some implementations of a distributed scheduling system to monitor dispatcher modules, and system status information 320, which includes status information on user computers and renderfarm computers.

The renderfarm monitoring system includes a set of one or more listener modules 330 adapted to receive renderfarm usage information from the set of sources 305. In an embodiment, there is a listener module corresponding to each dispatcher module. In a further embodiment, each dispatcher module broadcasts a stream of data specifying events handled by the dispatcher module. Events include job specifications, task requests, slot assignments, and task completion notifications. Each listener module receives the stream of events from its associated dispatcher module and updates a database system 340 with the state of all jobs and tasks. In yet a further embodiment, each listener module listens passively to the event stream broadcast by the corresponding dispatcher module; as a result, if the monitoring system malfunctions or fails, it does not disrupt dispatchers or other parts of the scheduling system.

In an additional embodiment, one or more of the set of listener modules 330 receive system status information 320 from user and renderfarm computers. In an embodiment, system status information is communicated using a network multicast protocol. In a further embodiment, a single listener module can receive multicast system status information from all of the user and renderfarm computers on the network or within a subnet of the network. If multicast network communications are restricted within a subnet, then additional listener modules can be provided to receive multicast system status information from user and renderfarm computers within other subnets. In another embodiment, a network management protocol, such as SNMP, can be used to communicate system status information 320 to the set of listener modules 330. The database system 340 is updated with system status information 320 received by the set of listener modules 330.

The database system 340 aggregates renderfarm usage information received from all of the set of listener modules. As the database system 340 receives renderfarm usage information from all of the dispatchers (via the set of listener modules 330), the database system 340 stores a comprehensive record of progress of all of the jobs and their tasks, including their dependencies. In an embodiment, the database system 240 includes one or more databases, such as SQL-compatible relational databases. In a further embodiment, the database system 240 is accessed by the set of listener modules 330 and client programs (discussed in detail below) via an API. The API can be tailored to the types of data stored in the database system, such as jobs, tasks, processing slots, listeners, and user and renderfarm computers.

In an additional embodiment, the set of listener modules 330 are supervised by a listener administration module 335. In an embodiment, each of the set of listener modules 330 and its corresponding dispatcher module are executed by its associated user computer. To locate and monitor the set of listener modules 330, the listener administrator module 335 contacts the dispatcher supervisor module 315 to locate all of the active dispatcher modules. The listener administrator module 335 can then contact the corresponding listener modules at these locations.

Renderfarm usage information can be retrieved from the database system 340 by one or more types of client applications 345. Client applications can include command line tools 350, standalone and web browser-based visualization applications 355, and data analysis applications 360. In an embodiment, client applications can retrieve renderfarm usage information from the database system 340 using an API. In a further embodiment, the API can be tailored to the types of data stored in the database system, such as jobs, tasks, processing slots, listeners, and user and renderfarm computers.

Renderfarm usage information can be used by clients in a number of different ways. One use is to analyze renderfarm usage to determine if resources are being used effectively and to plan future renderfarm expansions. For example, the renderfarm usage information can present a list or graph of jobs and tasks that are queued, processing, and/or blocked. This graph can be updated over time to show how the queue for renderfarm resources changes according to the work cycle of the animation studio. Similarly, renderfarm administrators can view graphs of distributions of queued tasks by time and complexity over the course of a day or week. Renderfarm administrators can spot trends in increasing queue lengths and plan expansion accordingly.

Another use of renderfarm information is to more efficiently administrate pending jobs or tasks. For example, if a renderfarm computer is taken offline or fails, the tasks being processed by the processing slots provided by this computer will fail. However, the dispatchers associated with these failed tasks will not immediately know that these tasks have failed and hours or days could pass before the dispatchers resubmit these failed tasks to the renderfarm for processing by different processor slots. Previously, renderfarm administrators could manually search log files for tasks running on a failed renderfarm computer and manually restart each one individually. This could be an arduous task requiring searching through log files of several days to isolate tasks that have been logged as started without a corresponding log entry indicating completion. Once each failed task has been located, renderfarm administrators must then manually resubmit each task.

In contrast, using the renderfarm usage information provided by an embodiment of the invention, renderfarm administrators can locate failed tasks associated with a failed renderfarm computer using a simple database query. For example, a database query can request a list of the tasks currently assigned to processing slots provided by the failed renderfarm computer. Renderfarm administrators can provide this list to the scheduler module to reschedule these tasks for different processing slots.

Renderfarm usage information can also be used to prioritize tasks to maximize the efficiency of the renderfarm. One metric of renderfarm efficiency is the number of jobs completed in a given amount of time. To maximize the number of jobs completed in a given amount of time, an embodiment of the invention first schedules a representative portion of the tasks for each job. For example, a representative portion of the tasks of a job can be the tasks needed to create a single frame in an animated sequence. Upon completion of each representative sample, the renderfarm usage information is analyzed to determine the total amount of time required to complete this sample of tasks and to estimate the remaining time, or cost, needed to complete the remaining tasks of the job. The scheduler module can then rank processing slot requests, giving a higher priority to tasks associated with jobs having a lower cost, or smaller estimated time to completion. In a further embodiment, cost estimates for jobs are revised and jobs are reprioritized as more tasks are completed.

Figure 4A:
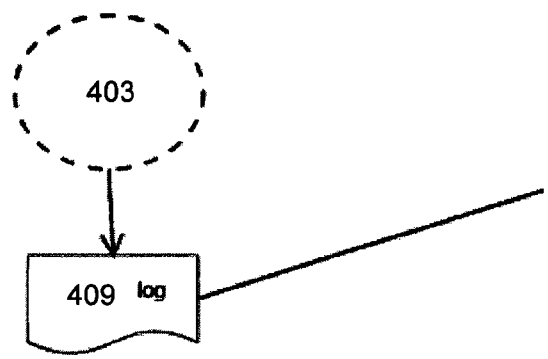
FIGS. 4A-4D illustrate the components of a renderfarm monitoring system according to an embodiment of the invention.
Figure 4A:
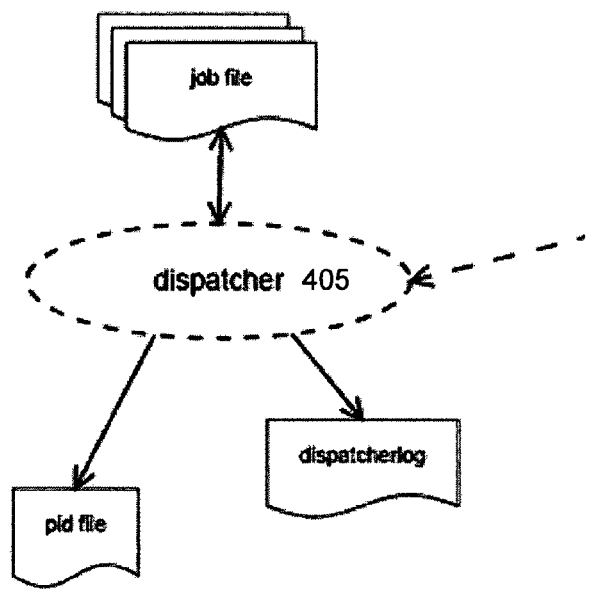
Figure 4A:
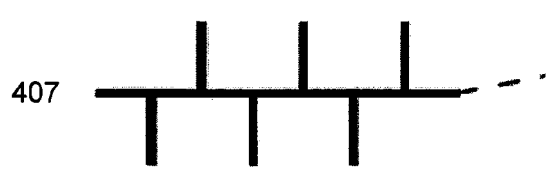

FIGS. 4A-4E illustrate the components of a renderfarm monitoring system according to an embodiment of the invention. FIG. 4A illustrates a set of renderfarm usage information sources 400, similar to the set of sources 305 discussed above, according to an embodiment of the invention. The set of sources includes a dispatcher supervisor 403, at least one dispatcher module 405, and system status information 407. In an embodiment, the dispatcher supervisor 403 creates a log file 409. Log file 409 includes a list of the locations of all active dispatcher modules. As discussed above, a listener administrator module can read log file 409 to located active dispatcher modules and their corresponding listener modules.

Figure 4B:
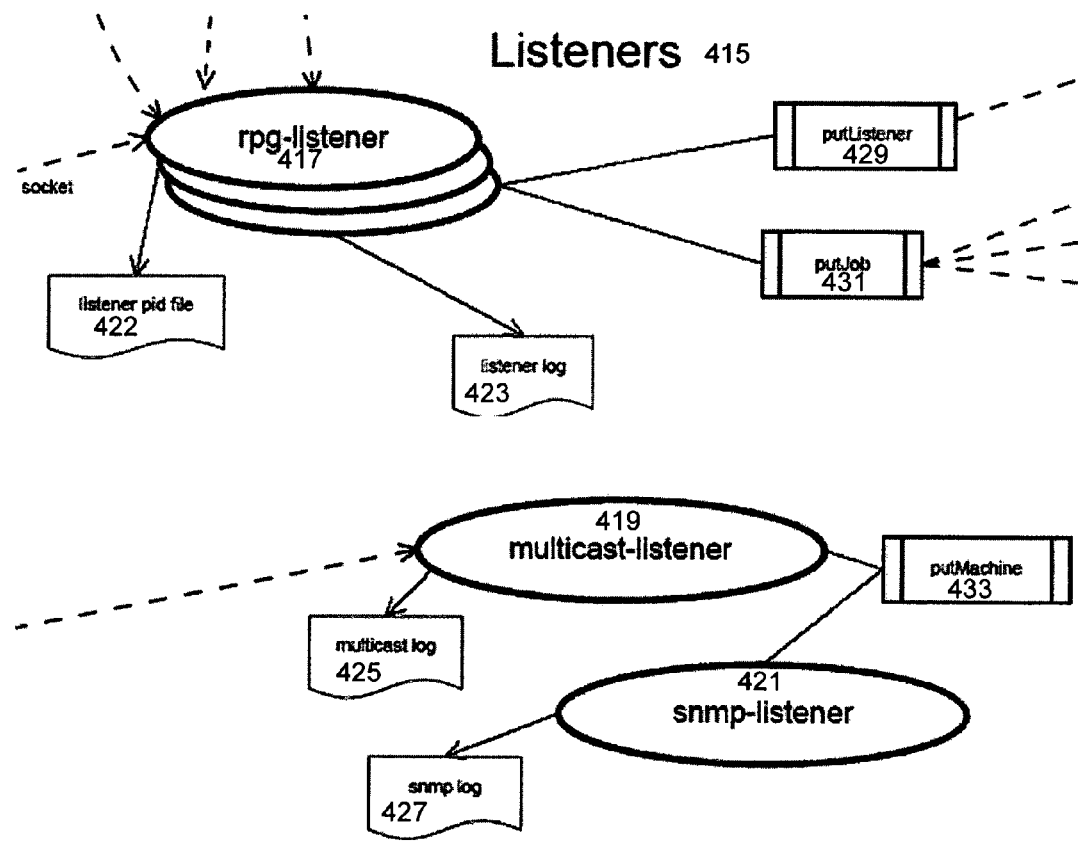

FIG. 4B illustrates a set of listener modules 415, similar to the set of listeners 330 discussed above, according to an embodiment of the invention. The set of listener modules includes at least one listener module 417 adapted to receive job and task related information from a dispatcher module 405, for example via a socket connection. A multicast listener module 419 is adapted to receive system status information 407 via a multicast protocol, while a SNMP listener 421 is adapted to receive similar information via the SNMP protocol or another network management protocol.

An embodiment of listener module 417 creates a listener pid file 422 to indicate that there is an active listener associated with a dispatcher module, preventing multiple listener modules from being assigned to the same dispatcher module. Embodiments of listener modules 417, 419, and 421 can include log files 423, 425, and 425, respectively, for recording a history of critical listener module activities, such as operational errors incurred by listener modules.

Listener modules 417, 419, and 421 update a database system with renderfarm usage information. In an embodiment, renderfarm usage information is communicated from listener modules such as 417, 419, and 421 to the database system using API calls including putListener 429, putJob 431, and putMachine 433, which update renderfarm usage data relating to listener modules, jobs, and user and renderfarm computers, respectively. In an additional embodiment, if the database system is unavailable or inaccessible to a listener module, the listener module caches renderfarm usage information until the database system is capable of receiving information from the listener module. In a further embodiment, listener modules communicate with the database system via a series of one or more proxy modules. Each proxy module receives data from multiple listener modules and outputs data via a single connection. Proxy modules can be used to reduce the required number of data connections for the database system, thereby improving database performance.

Figure 4C:
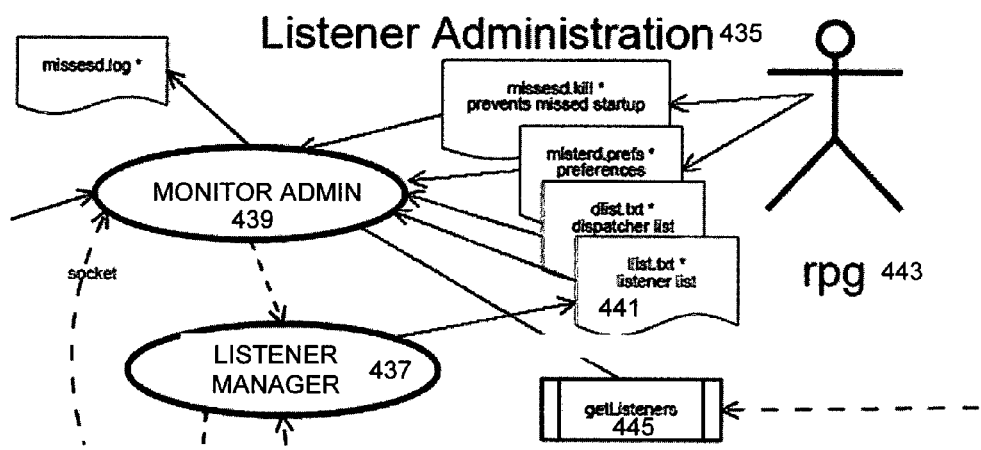

FIG. 4C illustrates a listener administrator module 435, similar to the listener administrator 335 discussed above, according to an embodiment of the invention. A monitoring administration module 439 uses configuration data 441 specified by a renderfarm administrator 443 to configure the renderfarm monitoring system. Configuration data 441 can specify the type of renderfarm usage data to be collected and the sources of renderfarm usage data. An embodiment of the configuration data 441 also allows the monitoring system to collect renderfarm usage data from multiple renderfarms, which can then be retrieved and analyzed separately or in aggregate. In an embodiment, there are multiple administration modules 439 to provide redundancy. The monitoring administration module 434 accesses the dispatcher supervisor module 403 (or in an embodiment, the log file 409) to identify active dispatchers and locate corresponding listener modules. In an embodiment, the monitoring administrator module can also retrieve a list of listener modules from the database system via an API call, such as getListeners 445. A listener manager 437 can be used to start and stop one or more listener modules using the listener locations retrieved by the monitoring administration module 439.

Figure 4D:
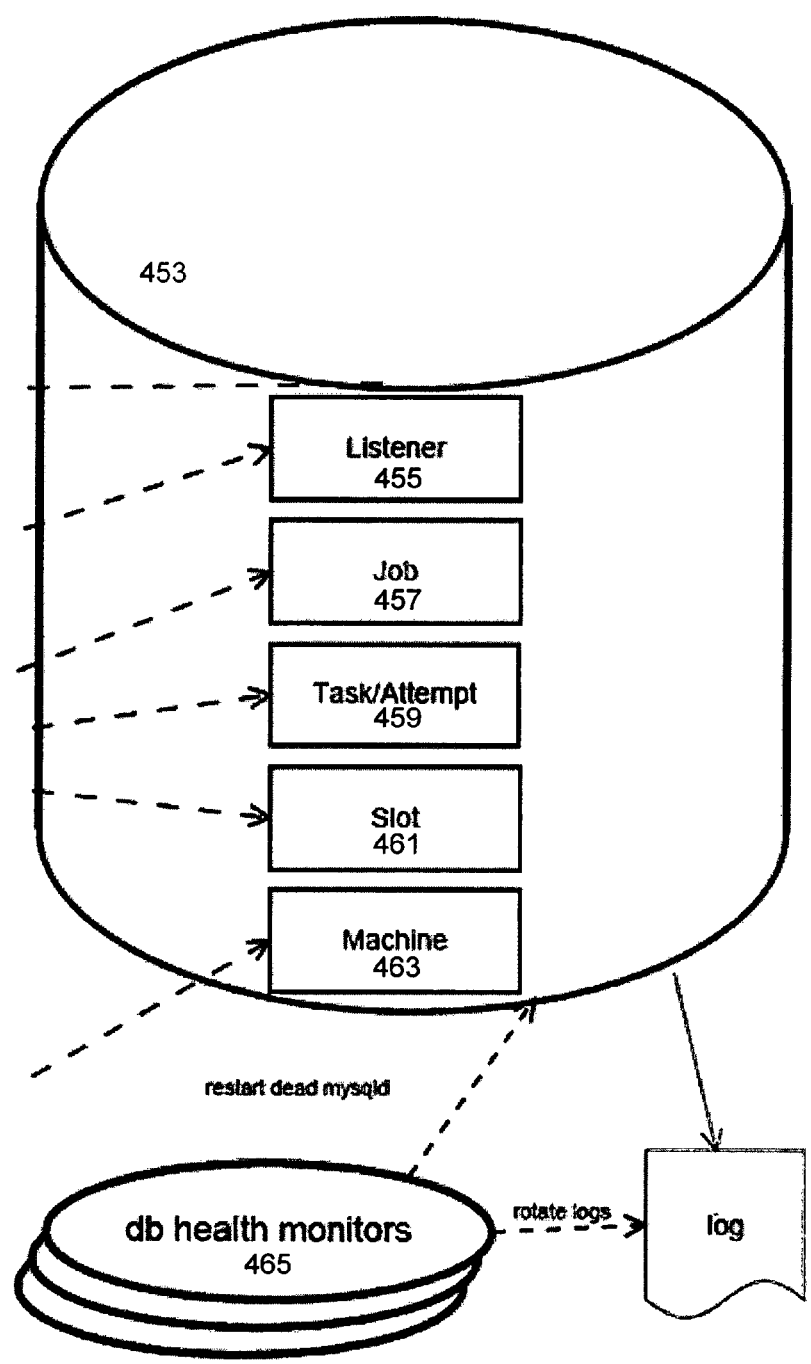

FIG. 4D illustrates a database system 450, similar to the database system 340 discussed above, according to an embodiment of the invention. Database system 450 includes one or more databases 453. In an embodiment, database 453 is a relational database adapted to store and retrieve information using the SQL query language. Database 453 includes tables or other data constructs for storing different types of rendering usage information. In an embodiment, rendering usage information stored in database 453 includes listeners 455, jobs 457, tasks 459, slots 461, and machines 463, such as renderfarm and user computers. A database health monitor 465 monitors the operation of database 453 and in an embodiment can restart the database 453 if it fails.

In a further embodiment, the database system 450 includes at least two databases 453. A first database is adapted to receive renderfarm usage information from listener modules. A second database periodically mirrors the contents of the first database. When tasks are complete, the corresponding renderfarm usage data is removed from the first database; however, a copy of this renderfarm usage data is maintained by the second database. As a result, the first database maintains renderfarm usage data for currently pending tasks, while the second database maintains an archive of all renderfarm usage data, including that from currently pending tasks and from completed tasks. Both databases can be accessed by client applications to retrieve renderfarm usage data. By using two databases, the performance and responsiveness of the monitoring system to renderfarm usage data requests is improved.

Figure 5:
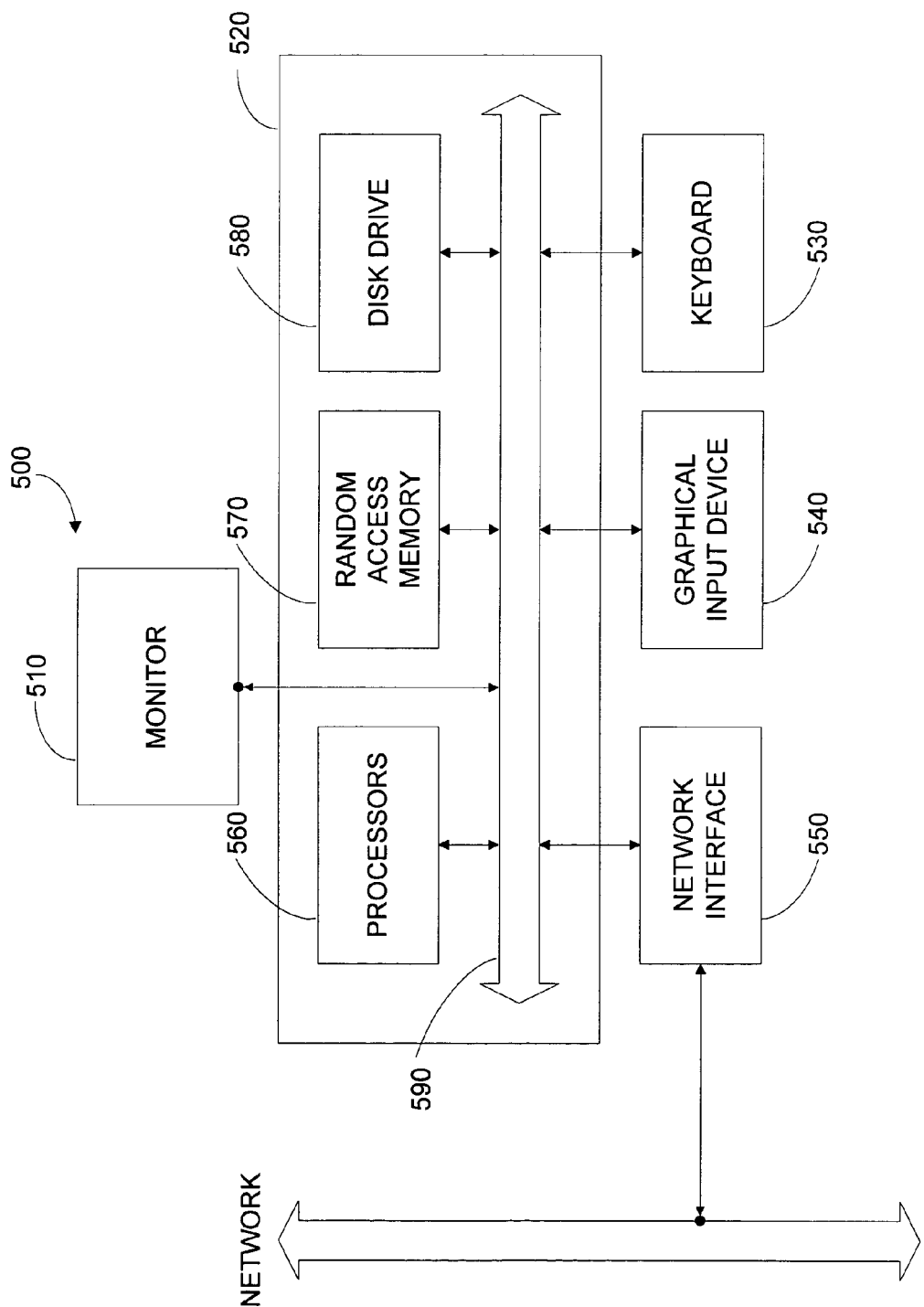
FIG. 5 illustrates an example computer system suitable for implementing an embodiment of the invention.

FIG. 5 illustrates an example computer system suitable for implementing an embodiment of the invention. FIG. 5 illustrates an example computer system 500 capable of implementing an embodiment of the invention. Computer system 500 typically includes a monitor 510, computer 520, a keyboard 530, a user input device 540, and a network interface 550. User input device 540 includes a computer mouse, a trackball, a track pad, graphics tablet, touch screen, and/or other wired or wireless input devices that allow a user to create or select graphics, objects, icons, and/or text appearing on the monitor 510. Embodiments of network interface 150 typically provides wired or wireless communication with an electronic communications network, such as a local area network, a wide area network, for example the Internet, and/or virtual networks, for example a virtual private network (VPN).

Computer 520 typically includes components such as one or more general purpose processors 560, and memory storage devices, such as a random access memory (RAM) 570, disk drives 580, and system bus 590 interconnecting the above components. RAM 570 and disk drive 580 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 520 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. For example, the listener module can be integrated with its corresponding dispatcher. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for monitoring a renderfarm, the system comprising:
    a plurality of dispatcher modules, each dispatcher module adapted to receive a renderfarm job including at least one renderfarm task from user application and adapted to receive renderfarm usage information associated with its renderfarm task from a renderfarm computer;
    a plurality of listener modules, each listener module adapted to interface with and to receive the renderfarm usage information from at least one of the plurality of dispatcher modules; and
    a database system adapted to aggregate a plurality of renderfarm usage information from the plurality of listener modules.

2. The system of claim 1, wherein each of the plurality of listener modules is adapted to receive a stream of events from at least one of the plurality of dispatcher modules, the stream of events indicating the renderfarm usage information.

3. The system of claim 1, wherein the renderfarm usage information includes a status of a renderfarm job.

4. The system of claim 1, wherein the renderfarm usage information includes a status of a renderfarm task.

5. The system of claim 4, wherein the status of the renderfarm task indicates that the renderfarm task is being processed by the renderfarm.

6. The system of claim 4, wherein the status of the renderfarm task indicates that the renderfarm task is waiting to be processed by the renderfarm.

7. The system of claim 6, wherein the status of the renderfarm task indicates that the renderfarm task requires the completion of a second renderfarm task included in the renderfarm job.

8. The system of claim 1, wherein each of the plurality of listener modules is adapted to submit renderfarm usage information to the database system via an application programming interface.

9. The system of claim 8, wherein the application programming interface includes a set of functions corresponding to a set of types of the renderfarm usage information.

10. The system of claim 1, further including a second plurality of listener modules, wherein each of at least a portion of the second plurality of listener modules is adapted to interface with and to receive second renderfarm usage information from at least one of a plurality of computers of the renderfarm.

11. The system of claim 10, wherein each of a second portion of the second plurality of listener modules is adapted to interface with and to receive the second renderfarm usage information from at least one of a plurality of user computers.

12. The system of claim 11, wherein the second renderfarm usage information includes a status of a computer.

13. The system of claim 10, wherein the second renderfarm usage information includes the availability of a processing slot associated with at least one of the plurality of computers of the renderfarm.

14. The system of claim 10, wherein each of a second portion of the second plurality of listener modules is adapted to receive the second renderfarm usage information via a multicast protocol.

15. The system of claim 1, wherein at least a portion of the plurality of listener modules are adapted to communicate renderfarm usage information with the database system via a proxy module.

16. The system of claim 1, wherein each of the plurality of dispatchers is adapted to analyze the renderfarm job to determine a first set of renderfarm tasks capable of being independently processed by the renderfarm; to submit the first set of renderfarm tasks to the renderfarm to be processed; to receive a notification of the completion of at least one of the first set of renderfarm tasks; and in response to receiving the notification, to analyze the renderfarm job to determine a second set of renderfarm tasks capable of being processed by the renderfarm using a result from the first set of renderfarm tasks.

17. The system of claim 1, further including a client adapted to receive renderfarm usage information from the database system.

18. The system of claim 17, wherein the client is adapted to receive a query specifying a set of criteria and to receive renderfarm usage information matching the set of criteria.

19. The system of claim 17, wherein the client is adapted to present a visualization of renderfarm usage information received from the database system.

20. The system of claim 17, wherein the client is adapted to perform an analysis of renderfarm usage information received from the database system.

21. The system of claim 17, wherein the client is adapted to retrieve renderfarm usage information from the database system via an application programming interface including a set of functions corresponding to a set of types of the renderfarm usage information.

22. A method of monitoring a renderfarm, the method comprising:
    receiving from a first dispatcher module first renderfarm usage information pertaining to a first renderfarm job, wherein the first dispatcher module is adapted to receive a first renderfarm job including at least one renderfarm task from a first user application and adapted to receive the first renderfarm usage information associated with its renderfarm task from a first renderfarm computer;
    receiving from a second dispatcher module second renderfarm usage information pertaining to a second renderfarm job, wherein the second dispatcher module is adapted to receive a second renderfarm job including at least one renderfarm task from a second user application and adapted to receive the second renderfarm usage information associated with its renderfarm task from a second renderfarm computer;
    communicating the first and second renderfarm usage information to a database system; and
    aggregating the first and second renderfarm usage information.

23. The method of claim 22, wherein the first renderfarm usage information is received by a first listener module and the second renderfarm usage information is received by a second listener module.

24. The method of claim 22, wherein receiving the first and second renderfarm usage information includes receiving a first and second stream of events from the first and second dispatcher modules. respectively.

25. The method of claim 22, wherein the first renderfarm usage information includes a status of a renderfarm job.

26. The method of claim 22, wherein the first renderfarm usage information includes a status of a renderfarm task.

27. The method of claim 26, wherein the status of the renderfarm task indicates that the renderfarm task is being processed by the renderfarm.

28. The method of claim 22, wherein the status of the renderfarm task indicates that the renderfarm task is waiting to be processed by the renderfarm.

29. The method of claim 22, wherein the status of the renderfarm task indicates that the renderfarm task requires the completion of a second renderfarm task included in the first renderfarm job.

30. The method of claim 22, wherein communicating the first and second renderfarm usage information to a database system includes communicating with the database system via an application programming interface including a set of functions corresponding to a set of types of the renderfarm usage information.

31. The method of claim 22, wherein each of the first and second dispatcher modules is adapted to analyze its associated renderfarm job to determine a first set of renderfarm tasks capable of being independently processed by the renderfarm; to submit the first set of renderfarm tasks to the renderfarm to be processed; to receive a notification of the completion of at least one of the first set of renderfarm tasks; and in response to receiving the notification, to analyze the renderfarm job to determine a second set of renderfarm tasks capable of being processed by the renderfarm using a result from the first set of renderfarm tasks.

32. The method of claim 22, further including communicating at least a portion of the first and second renderfarm usage information to a client.

33. The method of claim 32, wherein the client is adapted to receive renderfarm usage information from the database system.

34. The method of claim 32, wherein the client is adapted to receive a query specifying a set of criteria and to receive renderfarm usage information matching the set of criteria.

35. The method of claim 32, wherein the client is adapted to present a visualization of renderfarm usage information received from the database system.

36. The method of claim 32, wherein the client is adapted to perform an analysis of renderfarm usage information received from the database system.

37. The method of claim 32, wherein the client is adapted to retrieve renderfarm usage information from the database system via an application programming interface including a set of functions corresponding to a set of types of the renderfarm usage information.

38. An information storage medium including a set of instructions adapted to direct an information processing device to perform an operation comprising:
receiving from a first dispatcher module first renderfarm usage information pertaining to a first renderfarm job, wherein the first dispatcher module is adapted to receive a first renderfarm job including at least one renderfarm task from a first user application and adapted to receive the first renderfarm usage information associated with its renderfarm task from a first renderfarm computer;
receiving from a second dispatcher module second renderfarm usage information pertaining to a second renderfarm job, wherein the second dispatcher module is adapted to receive a second renderfarm job including at least one renderfarm task from a second user application and adapted to receive the second renderfarm usage information associated with its renderfarm task from a second renderfarm computer;
communicating the first and second renderfarm usage information to a database system; and
aggregating the first and second renderfarm usage information.

39. The information storage medium of claim 38, wherein the first renderfarm usage information is received by a first listener module and the second renderfarm usage information is received by a second listener module.

40. The information storage medium of claim 38, wherein receiving the first and second renderfarm usage information includes receiving a first and second stream of events from the first and second dispatcher modules, respectively.

41. The information storage medium of claim 38, wherein the first renderfarm usage information includes a status of a renderfarm job.

42. The information storage medium of claim 38, wherein the first renderfarm usage information includes a status of a renderfarm task.

43. The information storage medium of claim 42, wherein the status of the renderfarm task indicates that the renderfarm task is being processed by the renderfarm.

44. The information storage medium of claim 38, wherein the status of the renderfarm task indicates that the renderfarm task is waiting to be processed by the renderfarm.

45. The information storage medium of claim 38, wherein the status of the renderfarm task indicates that the renderfarm task requires the completion of a second renderfarm task included in the first renderfarm job.

46. The information storage medium of claim 38, wherein communicating the first and second renderfarm usage information to a database system includes communicating with the database system via an application programming interface including a set of functions corresponding to a set of types of the renderfarm usage information.

47. The information storage medium of claim 38, wherein each of the first and second dispatcher modules is adapted to analyze its associated renderfarm job to determine a first set of renderfarm tasks capable of being independently processed by the renderfarm; to submit the first set of renderfarm tasks to the renderfarm to be processed; to receive a notification of the completion of at least one of the first set of renderfarm tasks; and
in response to receiving the notification, to analyze the renderfarm job to determine a second set of renderfarm tasks capable of being processed by the renderfarm using a result from the first set of renderfarm tasks.

48. The information storage medium of claim 38, further including communicating at least a portion of the first and second renderfarm usage information to a client application.

49. The information storage medium of claim 48, wherein the client is adapted to receive renderfarm usage information from the database system.

50. The information storage medium of claim 48, wherein the client is adapted to receive a query specifying a set of criteria and to receive renderfarm usage information matching the set of criteria.

51. The information storage medium of claim 48, wherein the client is adapted to present a visualization of renderfarm usage information received from the database system.

52. The information storage medium of claim 48, wherein the client is adapted to perform an analysis of renderfarm usage information received from the database system.

53. The information storage medium of claim 48, wherein the client is adapted to retrieve renderfarm usage information from the database system via an application programming interface including a set of functions corresponding to a set of types of the renderfarm usage information.

* * * * *